US012789840B2

(12) United States Patent
Yang et al.

(10) Patent No.: US 12,789,840 B2
(45) Date of Patent: Nov. 10, 2026

(54) AUTOMATIC LABELING OF OBJECTS FROM LIDAR POINT CLOUDS VIA TRAJECTORY-LEVEL REFINEMENT

(71) Applicant: Waabi Innovation Inc., Toronto (CA)

(72) Inventors: Anqi Yang, Toronto (CA); Sergio Casas Romero, Toronto (CA); Mikita Dvornik, Toronto (CA); Sean Segal, Toronto (CA); Raquel Urtasun, Toronto (CA)

(73) Assignee: WAABI CANADA Inc., Toronto (CA)

( * ) Notice: Subject to any disclaimer, the term of this patent is extended or adjusted under 35 U.S.C. 154(b) by 104 days.

(21) Appl. No.: 18/736,522

(22) Filed: Jun. 6, 2024

(65) Prior Publication Data

US 2024/0409124 A1 Dec. 12, 2024

Related U.S. Application Data

(60) Provisional application No. 63/471,749, filed on Jun. 7, 2023.

(51) Int. Cl.

*B60W 60/00* (2020.01)
*G01S 17/89* (2020.01)
*G06N 3/0464* (2023.01)

(52) U.S. Cl.

CPC ........... *B60W 60/001* (2020.02); *G01S 17/89* (2013.01); *G06N 3/0464* (2023.01); *B60W 2420/408* (2024.01)

(58) Field of Classification Search

CPC ........... B60W 60/001; B60W 2420/408; G01S 17/89; G01S 17/931; G06N 3/0464; G06N 3/045

See application file for complete search history.

(56) References Cited

U.S. PATENT DOCUMENTS

2020/0082560 A1* 3/2020 Nezhadarya ............ G06T 15/20
2021/0082181 A1* 3/2021 Shi ....................... G06V 10/764

(Continued)

FOREIGN PATENT DOCUMENTS

CN 112699691 A * 4/2021 ............. G06F 40/58
CN 113609914 A * 11/2021 ........... G06F 18/214
CN 114155406 A * 3/2022 ........... G06F 18/253

OTHER PUBLICATIONS

Machine translation of CN-112699691-A (Year: 2021).*

(Continued)

*Primary Examiner* — Navid Z. Mehdizadeh
*Assistant Examiner* — Caitlin R McCleary
(74) *Attorney, Agent, or Firm* — Lathrop GPM LLP

(57) ABSTRACT

A method implements automatic labeling of objects from LiDAR point clouds via trajectory level refinement. The method includes executing an encoder model using a set of bounding box vectors and a set of point clouds to generate a set of combined feature vectors and executing an attention model using the set of combined feature vectors to generate a set of updated feature vectors. The method further includes executing a decoder model using the set of updated feature vectors to generate a set of pose residuals and a size residual and updating the set of bounding box vectors with the set of pose residuals and the size residual to generate a set of refined bounding box vectors. The method further includes executing an action responsive to the set of refined bounding box vectors.

20 Claims, 7 Drawing Sheets

(56) References Cited

U.S. PATENT DOCUMENTS

| | | | | |
|---|---|---|---|---|
| 2022/0301229 | A1* | 9/2022 | Zhang | G06T 9/00 |
| 2023/0281955 | A1* | 9/2023 | Ackerson | G06V 10/60 382/274 |

OTHER PUBLICATIONS

Machine translation of CN-114155406-A (Year: 2022).*
Machine translation of CN-113609914-A (Year: 2021).*
B. Yang, M. Bai, M. Liang, W. Zeng, and R. Urtasun. Auto4d: Learning to label 4d objects from sequential point clouds. CoRR, abs/2101.06586, 2021. URL https://arxiv.org/abs/2101.06586, Mar. 11, 2021, 8 pages.
C. R. Qi, Y. Zhou, M. Najibi, P. Sun, K. Vo, B. Deng, and D. Anguelov. Offboard 3d object detection from point cloud sequences. In Proceedings of the IEEE/CVF Conference on Computer Vision and Pattern Recognition (CVPR), pp. 6134-6144, Mar. 8, 2021, 18 pages.
A. Vaswani, N. Shazeer, N. Parmar, J. Uszkoreit, L. Jones, A. N. Gomez, L. U. Kaiser, and I. Polosukhin. Attention is all you need. URL https://proceedings.neurips.cc/paper_files/paper/2017/file/3f5ee243547dee91fbd053c1c4a845aa-Paper.pdf, Jan. 1, 2017, 11 pages.
L. Fan, Y. Yang, Y. Mao, F. Wang, Y. Chen, N. Wang, and Z. Zhang. Once detected, never lost: Surpassing human performance in offline lidar based 3d object detection. In ICCV, Apr. 24, 2023, 16 pages.
A. H. Lang, S. Vora, H. Caesar, L. Zhou, J. Yang, and O. Beijbom. Pointpillars: Fast encoders for object detection from point clouds. In Proceedings of the IEEE/CVF conference on computer vision and pattern recognition, pp. 12697-12705, May 7, 2019, 9 pages.
C. R. Qi, H. Su, K. Mo, and L. J. Guibas. Pointnet: Deep learning on point sets for 3D classification and segmentation. Proc. Computer Vision and Pattern Recognition (CVPR), IEEE, Apr. 10, 2017, 19 pages.
K. He, X. Zhang, S. Ren, and J. Sun. Deep residual learning for image recognition. In Proceedings of the IEEE conference on computer vision and pattern recognition, pp. 770-778, Dec. 10, 2015, 12 pages.
T.Y. Lin, P. Dollar, R. Girshick, K. He, B. Hariharan, and S. Belongie. Feature pyramid networks for object detection. In Proceedings of the IEEE conference on computer vision and pattern recognition, pp. 2117-2125, Apr. 19, 2017, 10 pages.
J. L. Ba, J. R. Kiros, and G. E. Hinton. Layer normalization. Jul. 21, 2016, 14 pages.
O. Press, N. Smith, and M. Lewis. Train short, test long: Attention with linear biases enables input length extrapolation. In International Conference on Learning Representations, URL https://openreview.net/forum?id=R8sQPpGCv0, Jan. 28, 2022, 25 pages.
I. Loshchilov and F. Hutter. Decoupled weight decay regularization. In International Conference on Learning Representations, 2019. URL https://openreview.net/forum?id=Bkg6RiCqY7, Dec. 20, 2018, 18 pages.

* cited by examiner

AUTOMATIC LABELING OF OBJECTS FROM LIDAR POINT CLOUDS VIA TRAJECTORY-LEVEL REFINEMENT

CROSS REFERENCE TO RELATED APPLICATIONS

This application claims benefit under 35 U.S.C. § 119 (e) to U.S. Patent Application Ser. No. 63/471,749 filed on Jun. 7, 2023. U.S. Patent Application Ser. No. 63/471,749 is incorporated herein by reference.

BACKGROUND

Self-driving systems include object detectors to identify trajectories for surrounding objects. The trajectories identify the location and movement of objects and may be used by the self-driving system to avoid the objects. The object detectors may be trained with manually annotated datasets. Manual annotation is a bottleneck to generating large data-sets to train object detectors as well as other models used by self-driving systems. Automatic labeling may be used, however, automatic labeling faces challenges including the handling object occlusions, the sparsity of observations as range increases, and the diverse size and motion profiles of objects.

SUMMARY

In an embodiment, aspects of the disclosure relate to a method implementing automatic labeling of objects from LiDAR point clouds via trajectory level refinement. The method includes executing an encoder model using a set of bounding box vectors and a set of point clouds to generate a set of combined feature vectors and executing an attention model using the set of combined feature vectors to generate a set of updated feature vectors. The method further includes executing a decoder model using the set of updated feature vectors to generate a set of pose residuals and a size residual and updating the set of bounding box vectors with the set of pose residuals and the size residual to generate a set of refined bounding box vectors. The method further includes executing an action responsive to the set of refined bounding box vectors.

In an embodiment, aspects of the disclosure relate to a system that includes at least one processor and a non-transitory computer readable medium that causes the at least one processor to perform operations for automatic labeling of objects from LiDAR point clouds via trajectory level refinement. The operations include executing an encoder model using a set of bounding box vectors and a set of point clouds to generate a set of combined feature vectors and executing an attention model using the set of combined feature vectors to generate a set of updated feature vectors. The operations further include executing a decoder model using the set of updated feature vectors to generate a set of pose residuals and a size residual and updating the set of bounding box vectors with the set of pose residuals and the size residual to generate a set of refined bounding box vectors. The operations further executing an action responsive to the set of refined bounding box vectors.

In an embodiment, aspects of the disclosure relate to a non-transitory computer readable medium with computer readable program code for causing a computing system to perform operations for automatic labeling of objects from LiDAR point clouds via trajectory level refinement. The operations include executing an encoder model using a set of bounding box vectors and a set of point clouds to generate a set of combined feature vectors and executing an attention model using the set of combined feature vectors to generate a set of updated feature vectors. The operations further include executing a decoder model using the set of updated feature vectors to generate a set of pose residuals and a size residual and updating the set of bounding box vectors with the set of pose residuals and the size residual to generate a set of refined bounding box vectors. The operations further executing an action responsive to the set of refined bounding box vectors.

Other aspects of one or more embodiments may be apparent from the following description and the appended claims.

BRIEF DESCRIPTION OF DRAWINGS

Similar elements in the various figures may be denoted by similar names and reference numerals. The features and elements described in one figure may extend to similarly named features and elements in different figures.

DETAILED DESCRIPTION

Figure 1:
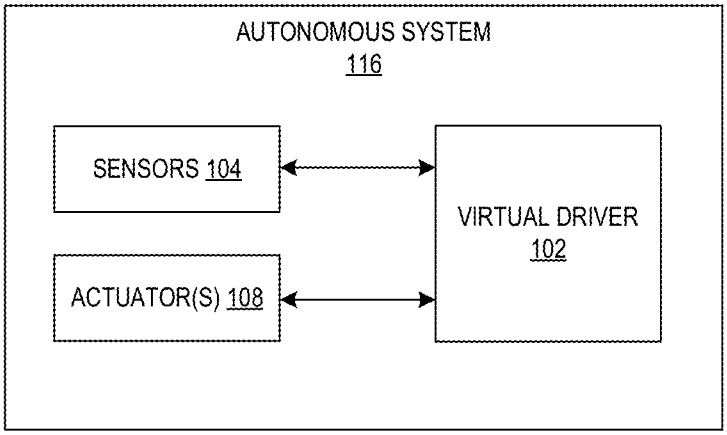
FIG. 1, FIG. 2, and FIG. 3 show diagrams of an autonomous training and testing system in accordance with one or more embodiments.

In general, embodiments implement automatic labeling of objects from point clouds via trajectory-level refinement. The automatic labeling may be performed as part of a two stage pipeline in which a first stage detects and tracks objects by generating trajectories from point clouds and the second stage refines the trajectories to handle object occlusions, observation sparsity, and size and motion diversity within the individual trajectories for objects.

One or more embodiments refine trajectories using a machine learning model, which may be referred to as a "labelformer" or as a trajectory refinement model, that uses attention layers of a transformer architecture to generate labels. Labels in this context refer to the location and size of objects that may be detected from point clouds generated by the sensors of a self-driving system. In an embodiment, the point clouds may be generated by a light detection and ranging (LiDAR) system, or simulation thereof, that is part of the self-driving system.

In one or more embodiments, the trajectory refinement model may be a second stage of the two stage pipeline. The trajectory refinement model may include and use multiple models to process the trajectories from the first stage of the pipeline with point clouds to generate size and pose residuals that may be combined with the trajectories from the first stage to yield refined trajectories. The refined trajectories may be presented to users, used to train other models of the self-driving system, may be used in practice by the self-driving system to avoid objects, etc.

The models within the trajectory refinement model may include an encoder model, an attention model, and a decoder model. The trajectories may include bounding box vectors that identify the location, size, and heading direction of an object. The location, size, and heading direction are information that capture the pose and size of a bounding box corresponding to the bounding box vector. The pose may include values for the location with coordinates and an angle for the heading direction. The size may include values for the length and width of the bounding box that fits to an object detected in the sensor data captured by the self-driving system.

For each frame of input, i.e., for time step, the encoder model encodes the bounding boxes and data from the point clouds into a combined feature vector in an embedding space. A combined feature vector may be analogous to the vector generated from a token that represents a word from a sentence and is input to a language model using a transformer architecture with attention.

The combined feature vectors for a sequence of frames are processed with the attention model to generate updated feature vectors over the sequence in the same embedding space. The updated feature vectors include updates to clean up, in the embedding space, locations and sizes of the bounding boxes from the trajectories from the first stage.

The updated feature vectors are processed with the decoder model to convert from the embedding space of the updated feature vectors to residual values in the bounding box space. The decoder model may generate pose residuals for each frame of a sequence of frames used to generate a trajectory as well as a size residual for the sequence. The generation of the pose residuals and size residuals are a practical application of the concepts of the disclosure. The pose residuals and size residuals may be related to and quantify the error between the original location estimates form sensory data and the actual location of objects that the self-driving system identifies and avoids.

The pose residuals and the size residuals are combined with the bounding box vectors to form refined bounding box vectors. The refined bounding box vectors may be used as labels to train other models or be used by the self-driving system to avoid objects.

Figure 2:
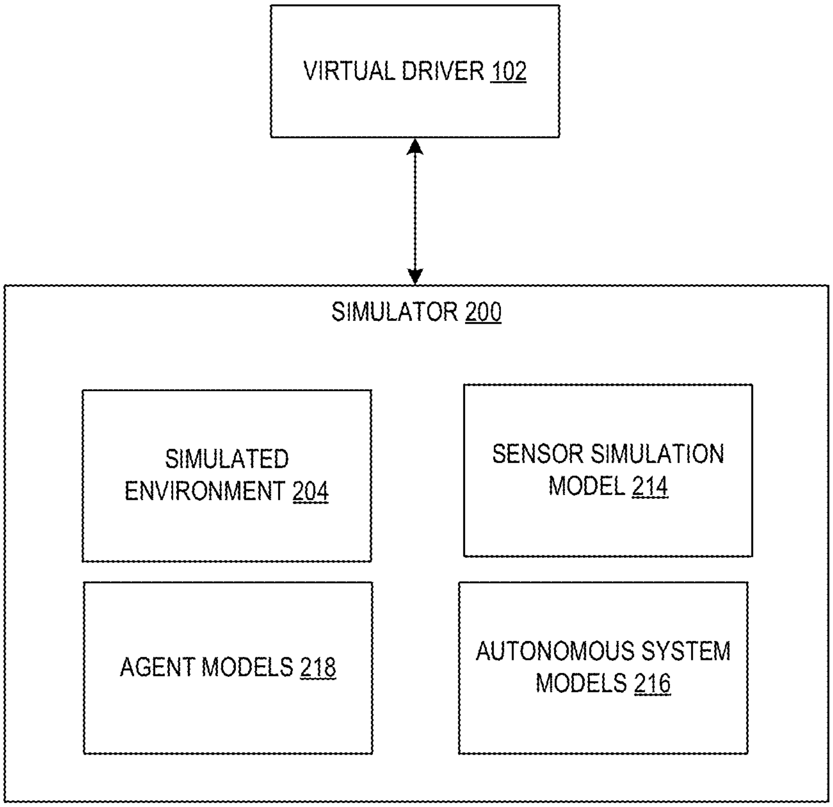

Turning to the Figures, FIG. 1 and FIG. 2 show example diagrams of the autonomous system and virtual driver. Turning to FIG. 1, an autonomous system (116) is a self-driving mode of transportation that does not require a human pilot or human driver to move and react to the real-world environment. The autonomous system (116) may be completely autonomous or semi-autonomous. As a mode of transportation, the autonomous system (116) is contained in a housing configured to move through a real-world environment. Examples of autonomous systems include self-driving vehicles (e.g., self-driving trucks and cars), drones, airplanes, robots, etc.

The autonomous system (116) includes a virtual driver (102) that is the decision making portion of the autonomous system (116). The virtual driver (102) is an artificial intelligence system that learns how to interact in the real world and interacts accordingly. The virtual driver (102) is the software executing on a processor that makes decisions and causes the autonomous system (116) to interact with the real world including moving, signaling, and stopping or maintaining a current state. Specifically, the virtual driver (102) is decision making software that executes on hardware (not shown). The hardware may include a hardware processor, memory or other storage device, and one or more interfaces. A hardware processor is any hardware processing unit that is configured to process computer readable program code and perform the operations set forth in the computer readable program code.

A real-world environment is the portion of the real world through which the autonomous system (116), when trained, is designed to move. Thus, the real-world environment may include concrete and land, construction, and other objects in a geographic region along with agents. The agents are the other agents in the real-world environment that are capable of moving through the real-world environment. Agents may have independent decision making functionality. The independent decision-making functionality of the agent may dictate how the agent moves through the environment and may be based on visual or tactile cues from the real-world environment. For example, agents may include other autonomous and non-autonomous transportation systems (e.g., other vehicles, bicyclists, robots), pedestrians, animals, etc.

In the real world, the geographic region is an actual region within the real world that surrounds the autonomous system. Namely, from the perspective of the virtual driver, the geographic region is the region through which the autonomous system moves. The geographic region includes agents and map elements that are located in the real world. Namely, the agents and map elements each have a physical location in the geographic region that denotes a place in which the corresponding agent or map element is located. The map elements are stationary in the geographic region, whereas the agents may be stationary or nonstationary in the geographic region. The map elements are the elements shown in a map (e.g., road map, traffic map, etc.) or derived from a map of the geographic region.

The real-world environment changes as the autonomous system (116) moves through the real-world environment. For example, the geographic region may change and the agents may move positions, including new agents being added and existing agents leaving.

In order to interact with the real-world environment, the autonomous system (116) includes various types of sensors (104), such as LiDAR sensors amongst other types, which are used to obtain measurements of the real-world environment, and cameras that capture images from the real-world environment. The autonomous system (116) may include other types of sensors as well. The sensors (104) provide input to the virtual driver (102).

In addition to sensors (104), the autonomous system (116) includes one or more actuators (108). An actuator is hardware and/or software that is configured to control one or more physical parts of the autonomous system based on a control signal from the virtual driver (102). In one or more embodiments, the control signal specifies an action for the autonomous system (e.g., turn on the blinker, apply breaks by a defined amount, apply accelerator by a defined amount, turn the steering wheel or tires by a defined amount, etc.). The actuator(s) (108) are configured to implement the action. In one or more embodiments, the control signal may specify a new state of the autonomous system and the actuator may be configured to implement the new state to cause the autonomous system to be in the new state. For example, the control signal may specify that the autonomous system should turn by a certain amount while accelerating at a predefined rate, while the actuator determines and causes the wheel movements and the amount of acceleration on the accelerator to achieve a certain amount of turn and acceleration rate.

The testing and training of the virtual driver (102) of the autonomous systems in the real-world environment may be unsafe because of the accidents that an untrained virtual driver can cause. Thus, as shown in FIG. 2, a simulator (200) is configured to train and test a virtual driver (102) of an autonomous system. For example, the simulator may be a unified, modular, mixed-reality, closed-loop simulator for autonomous systems. The simulator (200) is a configurable simulation framework that enables not only evaluation of different autonomy components of the virtual driver (102) in isolation, but also as a complete system in a closed-loop manner. The simulator reconstructs "digital twins" of real world scenarios automatically, enabling accurate evaluation of the virtual driver at scale. The simulator (200) creates the simulated environment (204) which is a virtual world in which the virtual driver (102) is a player in the virtual world. The simulated environment (204) is a simulation of a real-world environment, which may or may not be in actual existence, in which the autonomous system is designed to move. As such, the simulated environment (204) includes a simulation of the objects (i.e., simulated objects or agents) and background in the real world, including the natural objects, construction, buildings and roads, obstacles, as well as other autonomous and non-autonomous objects. The simulated environment simulates the environmental conditions within which the autonomous system may be deployed. The simulated objects may include both stationary and non-stationary objects. Non-stationary objects are agents in the real-world environment.

In the simulated environment, the geographic region is a realistic representation of a real-world region that may or may not be in actual existence. Namely, from the perspective of the virtual driver, the geographic region appears the same as if the geographic region were in existence if the geographic region does not actually exist, or the same as the actual geographic region present in the real world. The geographic region in the simulated environment includes virtual agents and virtual map elements that would be actual agents and actual map elements in the real world. Namely, the virtual agents and virtual map elements each have a physical location in the geographic region that denotes an exact spot or place in which the corresponding agent or map element is located. The map elements are stationary in the geographic region, whereas the agents may be stationary or nonstationary in the geographic region. As with the real world, a map exists of the geographic region that specifies the physical locations of the map elements.

The simulator (200) includes an autonomous system model (216), sensor simulation models (214), and agent models (218). The autonomous system model (216) is a detailed model of the autonomous system in which the virtual driver (102) will execute. The autonomous system model (216) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

The autonomous system model (216) includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment to update the simulated environment and the state of the autonomous system. The interface between the virtual driver (102) and the simulator (200) may match the interface between the virtual driver (102) and the autonomous system in the real world. Thus, to the virtual driver (102), the simulator simulates the experience of the virtual driver within the autonomous system in the real world.

In one or more embodiments, the sensor simulation model (214) models, in the simulated environment, active and passive sensor inputs. The sensor simulation models (114) are configured to simulate the sensor observations of the surrounding scene in the simulated environment (204) at each time step according to the sensor configuration on the vehicle platform. Passive sensor inputs capture the visual appearance of the simulated environment including stationary and nonstationary simulated objects from the perspective of one or more cameras based on the simulated position of the camera(s) within the simulated environment. Examples of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, and the measurements being simulated based on the simulated environment based on the simulated position of the sensor(s) within the simulated environment.

Agent models (218) represents an agent in a scenario. An agent is a sentient being that has an independent decision making process. Namely, in a real world, the agent may be an animate being (e.g., person or animal) that makes a decision based on an environment. The agent makes active movement rather than or in addition to passive movement. An agent model, or an instance of an actor model may exist for each agent in a scenario. The agent model is a model of the agent. If the agent is in a mode of transportation, then the agent model includes the model of transportation in which the agent is located. For example, actor models may represent pedestrians, children, vehicles being driven by drivers, pets, bicycles, and other types of actors.

Figure 3:
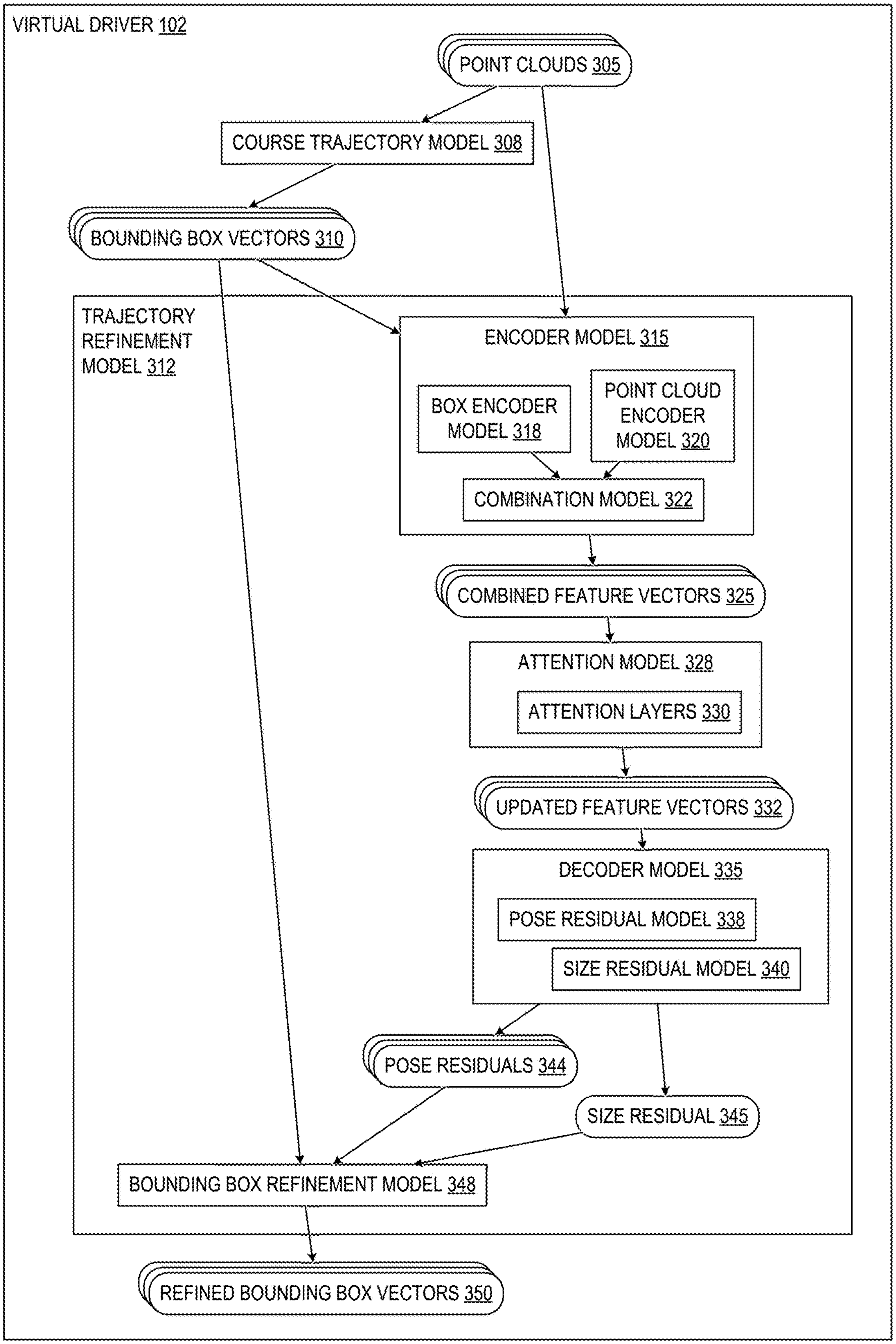

Turning to FIG. 3, an embodiment of the virtual driver (102) is described with additional detail. The virtual driver (102) processes the point clouds (305) to generate the refined bounding box vectors (350). The processing of the point clouds (305) to generate the refined bounding box vectors (350) is performed with the course trajectory model (308) and the trajectory refinement model (312).

The point clouds (305) are collections of data that identify the locations of objects in a physical space. In an embodiment, each point of one of the point clouds (305) includes location information and intensity information. In an embodiment, the sensor data is converted to three dimensional values that identify the location of a point that corresponds to an object in the physical space measured by the sensor system. For example, the location information and the intensity information may be structured as a four element vector with x, y, and z coordinate values and an intensity value. In an embodiment, a point cloud may be generated by a light detection and ranging (LiDAR) system that scans the physical space to generate a point cloud. A point cloud may be generated for each moment or step of time and associated with a timestamp (which may be included in the vector for a point). A point cloud may be generated by one or more sensor systems at each time step and included within the point clouds (305). A frame of data may include the point clouds generated by one or more sensor systems at a moment in time. A frame of data, including one or more of the point clouds (305), may be input to the course trajectory model (308) and to the encoder model (315).

The course trajectory model (308) is a collection of programs that may operate as part of the virtual driver (102). The course trajectory model (308) acts as a first stage model to generate the bounding box vectors (310) from the point clouds (305). In an embodiment, the course trajectory model (308) may take one of the point clouds (305) and generate a set of one or more of the bounding box vectors (310) as an output.

In an embodiment, the point clouds received by the course trajectory model (308) may be one point cloud of a frame of data that is processed by the course trajectory model (308). For the frame of data, the course trajectory model (308) may generate a bounding box vector, of the bounding box vectors (310), that identifies the location and direction of an object within the point clouds for the frame of data. The course trajectory model (308) may utilize a machine learning model (e.g., a neural network) that outputs the bounding box vectors (310) in response to the point clouds (305).

The machine learning models used by the system may operate using one or more layers of weights that are sequentially applied to sets of input data, referred to as input vectors. For each layer of a machine learning model, the weights of the layer may be multiplied by the input vector to generate a collection of products, which may then be summed to generate an output for the layer that may be fed as input data to the next layer within the machine learning model. The output of the machine learning model may be the output from the last layer within the machine learning model. The output may be a vector or scalar value. The layers within the machine learning model may be different. As an example, the machine learning model may include multiple attention layers, which may then be followed by perceptron layers that may include one or more linear layers (also referred to as fully connected layers) to provide the output. The machine learning model may be trained by inputting training data to the machine learning model to generate training outputs that are compared to expected outputs. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

Continuing with FIG. 3, the bounding box vectors (310) are collections of data that characterize the objects identified within the point clouds (305). The information within the bounding box vectors (310) may include pose and size information. The pose information may include information about the location and direction of an object. The size information may include information about the size (e.g., length and width) of an object. A bounding box vector, of the bounding box vectors (310), may include location, size, and direction information for an object detected in one of the point clouds (305). The location information may include Cartesian coordinates, x, y, and z axis coordinates, that identify the location of the center of an object within the physical space. The size information may include a length and a width that correspond to a physical value for the longest axis of the object (i.e., the length) and a value for an axis tangential to the longest axis of the object (i.e., the width). The length and width of the size information may be projected within the x, y plane of the location information. The direction information includes a value that identifies the angle of the direction of the object. The angle may be in the x, y plane about the z axis. The direction information may identify the direction of movement of the object that is labeled by a bounding box described by one of the bounding box vectors (310). The bounding box vectors (310) are outputs from the course trajectory model (308) and may be input to the encoder model (315) and the bounding box refinement model (348) of the trajectory refinement model (312).

The trajectory refinement model (312) is a collection of programs that may operate as part of the virtual driver (102) to process the bounding box vectors (310) with the point clouds (305) to generate the refined bounding box vectors (350). In an embodiment, the trajectory refinement model (312) may process a trajectory for one object at a time. The trajectory may include, for one object, the bounding box vectors (310) that correspond to the object from multiple frames. To generate the refined bounding box vectors (350) from the bounding box vectors (310) and the point clouds (305), the trajectory refinement model (312) may use the encoder model (315), the attention model (328), the decoder model (335), and the bounding box refinement model (348).

The encoder model (315) is a collection of programs that may operate as part of the trajectory refinement model (312). The encoder model (315) processes the bounding box vectors (310) and the point clouds (305) to generate the combined feature vectors (325). The encoder model (315) generates the combined feature vectors (325) using the box encoder model (318), the point cloud encoder model (320), and the combination model (322).

The box encoder model (318) is a collection of programs that may be executed as part of the encoder model (315). The box encoder model (318) may process one of the bounding box vectors (310) to generate a box feature vector that may be an input to the combination model (322). In an embodiment, the box encoder model (318) may be a perceptron model that includes a set of one or more linear layers of weights that may be applied to a bounding box vector and generate a box feature vector. Perceptron models include one or more layers of weights that may fully connect each of the inputs to each of the outputs for each layer of the perceptron model. The weights are multiplied with the inputs and the corresponding products summed to generate the outputs of a layer, which may include one or more values organized as a scaler, vector, matrix, etc. The box feature vector identifies a point in a latent space. In an embodiment, the latent space may include hundreds of dimensions as compared to the bounding box vectors (310) which may only have tens of dimensions.

The point cloud encoder model (320) is a collection of programs that may execute as part of the encoder model (315). The point cloud encoder model (320) may process one of the point clouds (305) to generate a point cloud feature vector, which may be an input to the combination model (322). The point cloud feature vector may correspond to the same latent space as the box feature vector generated by the box encoder model (318).

In an embodiment, the point cloud encoder model (320) may include a convolutional neural network that is used to process information from the point clouds (305) and generate a point cloud feature vector. In an embodiment, the point cloud encoder model (320) may filter information from one of the point clouds (305) based on one of the bounding box vectors (310) to form the input to the machine learning model utilized by the point cloud encoder model (320). For example, the point cloud encoder model (320) may expand the size of one of the bounding box vectors (310) by a fixed percentage (e.g., 10%) and filter one of the point clouds (305) to include the points within the expanded bounding box as the input to the machine learning model utilized by the point cloud encoder model (320) to generate the point cloud feature vector.

The combination model (322) is a collection of programs that may execute as part of the encoder model (315). The combination model (322) receives a box feature vector from the box encoder model (318) and receives a point cloud feature vector from the point cloud encoder model (320) to generate one of the combined feature vectors (325). The combination model (322) may be a machine learning model, e.g., a perceptron model. In an embodiment, the combination model (322) may mathematically combine the box feature vector and the point cloud feature vector. For example, the combination model (322) may add, average, append, etc., the box feature vector with the point cloud feature vector to generate a combined feature vector of the combined feature vectors (325).

The combined feature vectors (325) are collections of data that describe objects within the point clouds (305) in a latent space. In an embodiment, one of the combined feature vectors (325) may correspond to one of the bounding box vectors (310) for one object from one of the point clouds (305). In an embodiment, a set of one or more of the combined feature vectors (325) correspond to a trajectory of an object that includes a set of the bounding box vectors (310).

The attention model (328) is a collection of programs that operate as a machine learning model to process the combined feature vectors (325) and generate the updated feature vectors (332). In an embodiment, the attention model (328) may be a neural network that uses a transformer algorithm with the attention layers (330). In an embodiment, the attention model (328) may be trained with trajectories that have missing data or that have randomly perturbed data. The perturbations may include changing the positions, sizes, and headings identified by the bounding box vectors within the training data. Additionally, the training data for the attention model (328) as well as the trajectory refinement model (312) may be generated by a simulation.

The attention layers (330) are layers of the attention model (328). In an embodiment, each of the attention layers (330) may apply a self-attention algorithm to an input to generate an output for a subsequent layer of the attention layers (330). Each of the attention layers (330) may utilize query, key, and value matrices in accordance with the self-attention algorithm. A set of query, key, and value matrices may form one head within one of the attention layers (330) to process the combined feature vectors (325) and generate the updated feature vectors (332). Each of the attention layers (330) may have multiple attention heads, which may correspond to multiple sets of query, key, and value matrices used within one of the attention layers (330). In an embodiment, after the attention layers (330), one or more perceptron layers may be included within the attention model (328) to generate the output of the attention model (328). The output of the attention model (328) and of the last one of the attention layers (330) is the updated feature vectors (332).

The updated feature vectors (332) are collections of data generated from the combined feature vectors (325) by the attention model (328). The updated feature vectors (332) include refinements to the combined feature vectors (325) and may be in the same latent space as the combined feature vectors (325). In an embodiment, one of the updated feature vectors (332) corresponds to one of the combined feature vectors (325). The updated feature vectors (332) are input to the decoder model (335).

The decoder model (335) is a collection of programs that operate as a machine learning model to process the updated feature vectors (332) from the attention model (328) and generate the pose residuals (344) and the size residuals (345). In an embodiment, the decoder model (335) decodes the updated feature vectors (332) to the pose residuals (344) and the size residuals (345), which are in a space corresponding to the space of the bounding box vectors (310) to allow the pose residuals (344) and the size residuals (345) to be combined with the bounding box vectors (310). To generate the pose residuals (344), the decoder model (335) uses the pose residual model (338). To generate the size residual (345), the decoder model (335) uses the size residual model (340).

The pose residual model (338) is a collection of programs that operates under the decoder model (335) to process the updated feature vectors (332) and generate the pose residuals (344). In an embodiment, the pose residual model (338) may include a perceptron model with one or more perceptron layers (which may also be referred to as linear layers or fully connected layers) that are applied to the updated feature vectors (332) to generate the pose residuals (344). In an embodiment, the pose residual model (338) is applied to one of the updated feature vectors (332) to generate one of the pose residuals (344).

The size residual model (340) is a collection of programs that may operate under the decoder model (335) to process the updated feature vectors (332) and generate the size residual (345). In an embodiment, the size residual model (340) may include a mean pooling layer that averages the updated feature vectors (332) to a single updated feature vector that is then further processed to form the size residual (345). In an embodiment after the mean pooling layer, a perceptron model with one or more layers may process the output of the mean pooling layer to generate the size residual (345). The perceptron model of the size residual model (340) may be different from the other perceptron models used by the trajectory refinement model including the perceptron model of the pose residual model (338).

The pose residuals (344) are collections of data generated by the decoder model (335) from the updated feature vectors (332). The pose residuals (344) are the differences between observed values and predicted values for location and direction information. For example, one of the pose residuals (344) is the difference between one of the bounding box vectors (310) and a predicted value for the bounding box vector. Such that adding a pose residual to the bounding box vector may yield the predicted value for the location and direction of the bounding box vector.

The size residual (345) is a collection of data generated from the updated feature vectors (332). The size residual (345) corresponds to the size information (e.g., length and width) from the bounding box vectors (310). The size of an object should remain the same throughout each frame of a trajectory and the decoder model (335) predicts a single size residual (345) that corresponds to each of the bounding box vectors (310). The size residual (345), along the pose residuals (344), are inputs to the bounding box refinement model (348).

The bounding box refinement model (348) is a collection of programs that generate the refined bounding box vectors (350) from the bounding box vectors (310), the pose residuals (344), and the size residual (345). In an embodiment, the location information in each of the bounding box vectors (310) may be updated with information from one of the corresponding pose residuals (344). For example, the x, y coordinates and direction from the first bounding box vector (310) may be added to the residual information from the first pose residual (344) to generate updated location information that is stored in the first refined bounding box vector (350).

In an embodiment, the size information from the bounding box vectors (310) may be normalized and updated with the size residual (345). For example, the length and width information from the bounding box vectors (310) may be averaged and then added to the length and width residuals from the information from the size residual (345) to generate a single length and width. The single length and width may then be used to replace the size information (the length and width) in one of the bounding box vectors (310) to form one of the refined bounding box vectors (350).

The refined bounding box vectors (350) are a collection of data generated by the bounding box refinement model (348) from the bounding box vectors (310), the pose residuals (344), and the size residual (345). The refined bounding box vectors (350) are refined versions of the bounding box vectors (310). The refined bounding box vectors (350) include updated location, size, and direction information that may correspond to a more realistic trajectory of an object in a physical space.

Figure 4:
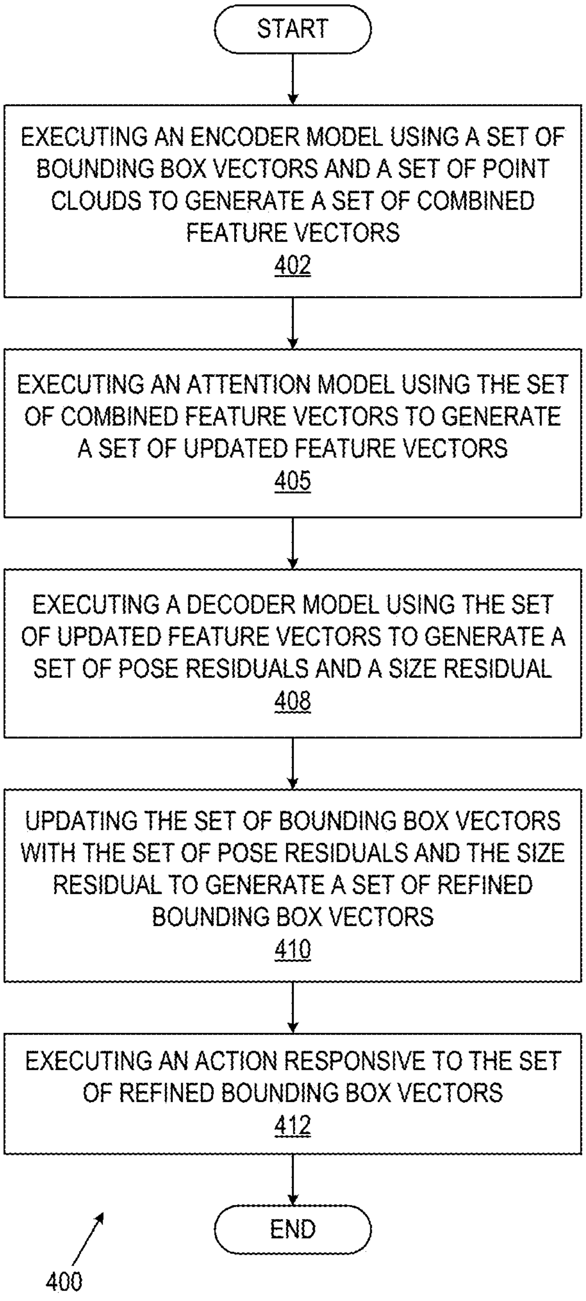
FIG. 4 shows a flowchart of the autonomous training and testing system in accordance with one or more embodiments.

Turning to FIG. 4, the process (400) may be part of a practical application to automatically label objects from point clouds via trajectory-level refinement. The method of FIG. 4 may be implemented using the systems described in the other figures, and one or more of the steps may be performed on, or received at, one or more computer processors. In an embodiment, a system may include at least one processor and an application that, when executing on the at least one processor, performs the method. In an embodiment, a non-transitory computer readable medium may include instructions that, when executed by one or more processors, perform the method. The outputs from various components (including models, functions, procedures, programs, processors, etc.) performing the method may be generated by executing one or more transformations to inputs using the components to create the outputs without using mental processes or human activities. The process (400) may include multiple steps (e.g., steps 402 through 412) that may execute on the components described in the other figures.

Step 402 includes executing an encoder model using a set of bounding box vectors and a set of point clouds to generate a set of combined feature vectors. The set of combined feature vectors includes a combined feature vector generated from a bounding box vector of the set of bounding box vectors and from a point cloud of the set of point clouds. The set of bounding box vectors may be generated by and received from a first stage model, i.e., from a course trajectory model. The outputs of the encoder model, i.e., the combined feature vectors may be input to an attention model.

In an embodiment, executing the encoder model includes executing a box encoder model, of the encoder model, using the bounding box vector to generate a box feature vector. In an embodiment, the box encoder model includes a perceptron model. The output of the box encoder model (i.e., the box feature vector) may be a box feature vector that has more dimensions (e.g., 20 to 100 total dimensions in a latent space) than the bounding box vector (e.g., 6 dimensions for x, y, z coordinates, length, width, and direction) used as input. The box feature vector is a vector of a latent space that encodes information about an object represented by the bounding box vector. The perceptron model of the box encoder model may include a set of layers of weights. The weights of a layer are multiplied by the input to the layer to generate products, which are summed to generate an output to the layer.

In an embodiment, executing the encoder model includes executing a point cloud encoder model, of the encoder model, using the point cloud to generate a point cloud feature vector. In an embodiment, the point cloud encoder model includes a convolutional neural network. Data from the point cloud from a sensor may first be voxelized and filtered to a set of points in an $N_x \times N_y \times N_z$ grid (e.g., 240 by 80 by 320). The grid of points may be input to additional machine learning models (e.g., perceptron models) to generate $N_x \times N_y$ "pillars" of $\in \mathbb{R}^{Nz \times C}$ data (e.g., C may be 32). The pillars of data may be input to a convolutional neural network model.

In an embodiment, executing the encoder model includes executing a combination model, of the encoder model, using a box feature vector and a cloud feature vector to generate a combined feature vector. The combined feature vector may be one of a set of combined feature vectors generated by the combination model of the encoder model. In an embodiment, the combination model may apply another perceptron model to the output of the point cloud encoder model in which the output of the perceptron model has the same dimensionality as the output of the box encoder model. The box feature vector (output from the box encoder model) may be added to the output from the perceptron model (that received the point cloud feature vector as input) to form a combined feature vector.

Step 405 includes executing an attention model using the set of combined feature vectors to generate a set of updated feature vectors. The combined feature vectors used as input may be the output from the encoder model.

In an embodiment, executing the attention model includes executing an attention layer of the attention model to perform one or more transformations to the set of combined feature vectors to generate an updated feature vector of the set of updated feature vectors. The transformations may include multiplying weights from the attention layer to the input of the attention layer to generate products that are summed to generate outputs. Self-attention may be used with multiple sets of query, key, and value matrices (i.e., multiple heads) for each layer to generate output vectors for the layers that have the same dimensionality as the inputs to the layer. In an embodiment, executing the attention model includes executing a subsequent attention layer using an output from the attention layer to generate the set of updated feature vectors. The output of the last attention layer of the set of attention layers within the attention model may be the output of the attention model.

Step 408 includes executing a decoder model using the set of updated feature vectors to generate a set of pose residuals and a size residual. The decoder model may use a pose residual model and a size residual model to decode the updated feature vectors to the set of pose residuals and the size residual.

In an embodiment, executing the decoder model includes executing a pose residual model, of the decoder model, using an updated feature vector of the set of updated feature vectors to generate a pose residual corresponding to the bounding box vector. The pose residual model includes a perceptron model. The perceptron model may operate independently on each updated feature vector to output a pose residual that corresponds to one of the updated feature vectors. In an embodiment, the pose residuals may include residuals for x, y, and z coordinates and a residual for the direction.

In an embodiment, executing the decoder model includes executing a size decoder model using the set of updated feature vectors to generate the size residual. The size decoder model may include a mean pooling layer and a perceptron model. Since the size of the object should remain the same in each frame of data, the size is averaged over the set of frames to generate a consistent size with the mean pooling layer. The perceptron model may receive the output of the mean pooling layer and output residuals for the length and width of an object.

Step 410 includes updating the set of bounding box vectors with the set of pose residuals and the size residual to generate a set of refined bounding box vectors. In an embodiment, updating the set of bounding box vectors includes generating the refined bounding box vector by combining a pose residual, of the set of pose residuals, and the size residual with the bounding box vector. Generation of the refined bounding box vector may be executed by a bounding box refinement model after the decoder model generates the pose residuals and the size residual. Each of the pose residuals may be combined with a corresponding bounding box vector to generate a refined bounding box vector. The size of the object identified by the length and width may be updated by averaging the lengths and widths from the bounding box vectors and then applying the length and width residuals to the average length and width, which is then stored to each of the refined bounding box vectors.

Step 412 includes executing an action responsive to the set of refined bounding box vectors. In an embodiment, executing the action includes presenting a refined bounding box vector of the set of refined bounding box vectors. Presentation of the refined bounding box may include transmitting the refined bounding box to a device that displays the refined bounding box. For example, an autonomous system may include a display screen that displays the refined bounding box.

In an embodiment, executing the action includes updating a course of a vehicle using the set of refined bounding box vectors. As an example, a virtual driver may identify that the course of an autonomous system may intersect with the trajectory of an object. To avoid the intersection (i.e., to avoid a collision) the virtual driver may identify a different course to avoid the trajectory of the object.

In an embodiment, the trajectory refinement model is trained. The trajectory refinement model may be a machine learning model that includes the encoder model, the attention model, and the decoder model to generate the set of pose residuals and the size residual from the set of bounding box vectors and the set of point clouds using training data. The models that make up the trajectory refinement model may be trained individually or in combination.

In an embodiment, training the trajectory refinement model includes executing the trajectory refinement model using the training data to create training output. As an example, the training data may include sensor data and the output of a stage 1 model (i.e., a course trajectory model) that are input to the trajectory refinement model. In response, the trajectory refinement model may output training pose residuals and training size residuals.

In an embodiment, training the trajectory refinement model includes executing a loss function using the training output to generate training updates. As an example, the output from the trajectory refinement model may be training pose residuals and training size residuals, which are compared to expected values for the pose and size residuals to identify the error or loss between the output from the trajectory refinement model and the expected values for the residuals. The output from the loss function may generate training updates for the weights of the trajectory refinement model using backpropagation and gradient descent.

In an embodiment, multiple types of loss functions may be used and combined to calculate the error used to generate the updates. For example, the loss function may calculate the difference (error) between the predicted values for location, size, and direction information (the error for each of the x, y, z coordinates, length, width, and direction). The intersection over union may also be calculated between the area of the predicted bounding box compared to the area of the expected bounding box. In an embodiment, the loss function for the trajectory refinement model may combine the calculated differences and the intersection over union to identify the loss for the trajectory refinement model. The combination may be a summation or a weighted combination.

In an embodiment, training the trajectory refinement model includes combining the training updates with the trajectory refinement model to update the trajectory refinement model. By updating the trajectory refinement model with the training updates, the updated or "trained" trajectory refinement model may make improved predictions for the outputs (e.g., the pose and size residuals).

Figure 5:
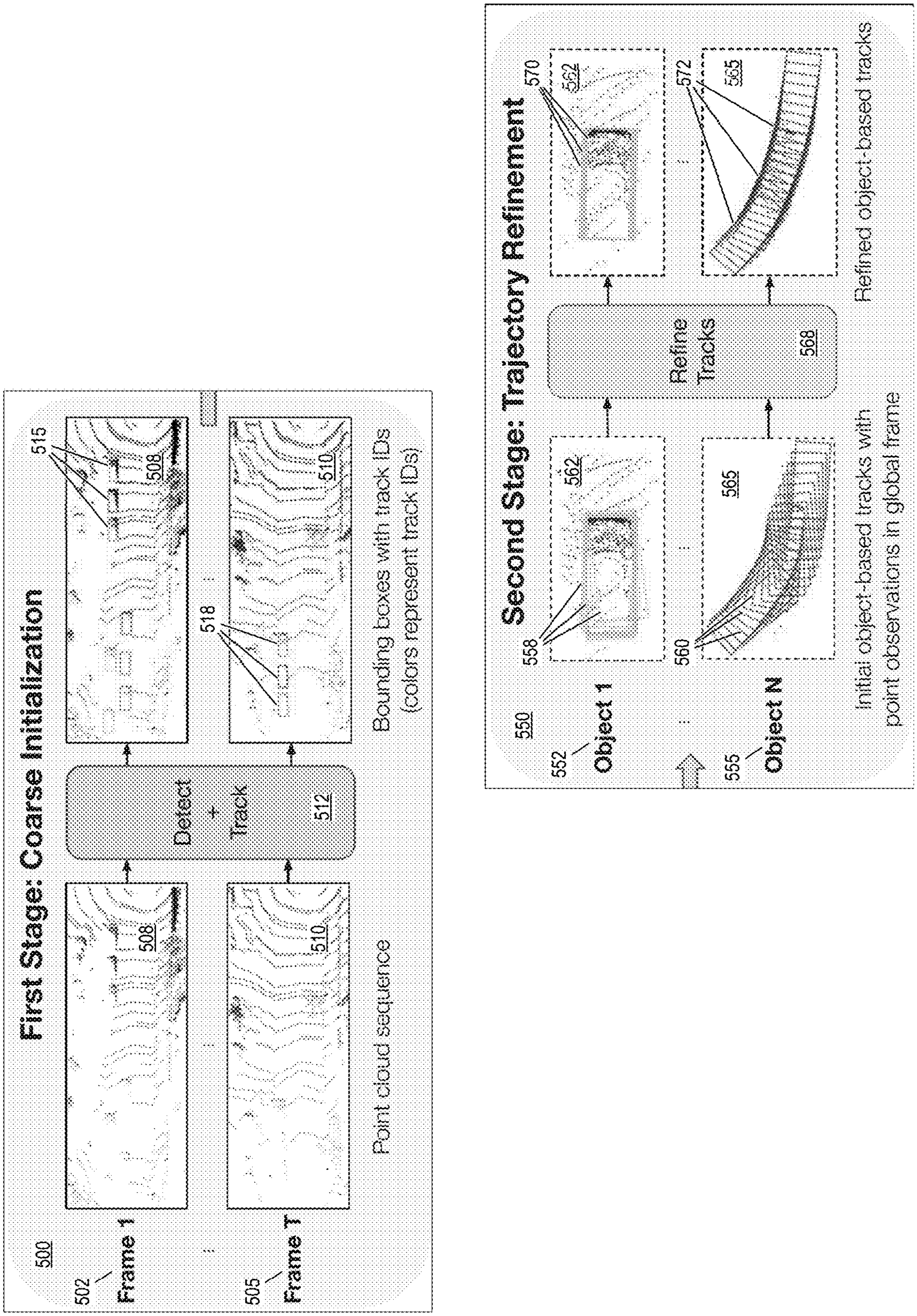
FIG. 5 and FIG. 6 show examples in accordance with one or more embodiments of the disclosure.

Turning to FIG. 5, the coarse initialization model (500) (a first stage) operates in conjunction with the trajectory refinement model (550) (a second stage) to process point clouds and generate trajectories to track objects within the point clouds. The coarse initialization model (500) and the trajectory refinement model (550) may operate as programs as part of a virtual driver.

The coarse initialization model (500) receives sensor data (including the point clouds (508) through (510)) as input, which is processed by the model (512) to generate the bounding boxes (515) through (518). The coarse initialization model (500) receives input data in frames. The frames include the frame (502) and the frame (505), as well as the intermediate frames between the frame (502) and the frame (505). Each of the frames includes one or more point clouds from one or more sensor devices. As an example, the frame (502) includes the point cloud (508) from a sensor device that also generates the point cloud (510) for the frame (505) at a later time. The frames of sensor data each correspond to a timestamp and are input to the model (512).

The model (512) processes the point clouds (508) through (510) with respect to the frames (502) through (505) to generate the bounding boxes (515) through (518). The model (512) may use one or more machine learning models to identify the number of objects and bounding boxes for the objects within the point clouds received by the model (512). The output of the model (512) includes the bounding boxes (515) through (518).

The bounding boxes (515) identify the location information, size information, and direction information for objects detected within the point cloud (508). Similarly, the bounding boxes (518) identify the location information, size information, and direction information for the same objects in the point cloud (510), which was captured by the same sensor device (at a later time) as the point cloud (508). In an embodiment, each of the objects may be identified within the point clouds using bounding boxes of different colors. The same object between point clouds at different frames may have the same color. The system utilizing the coarse initialization model (500) may identify a trajectory for an object that includes the bounding boxes for that object for each frame that was processed by the coarse initialization model (500). The trajectory, i.e., the collection of bounding boxes for one object for multiple frames of data, may be input to the trajectory refinement model (550) for a second stage of processing.

The trajectory refinement model (550) processes the bounding boxes output from the coarse initialization model (500) in conjunction with the point clouds from the sensor devices to generate refined bounding boxes. The refined bounding boxes better predict the position of objects at physical locations based on the point clouds generated by the sensor device at the physical location. The trajectory refinement model (550) may process each object individually by processing the trajectory of bounding boxes for an object identified with the coarse initialization model (500). For example, the object (552) may be a first object of a list of objects identified by the coarse initialization model (500) and the object (555) may be the last object identified with the coarse initialization model (500).

The bounding boxes (558) are the collection of bounding boxes (i.e., the trajectory) identified from the point clouds from the sequence of frames (502) through (505). The location and direction of the bounding boxes (558) indicate that the object identified by the bounding boxes (558) moves and changes direction little, if at all. The point cloud (562), in an embodiment, may be representative of each of the point clouds (508) through (510) of the frames (502) through (505) in which the object was detected and the bounding boxes (558) were generated. The bounding boxes (558) may differ from the bounding boxes (515) and the bounding boxes (518) in that the bounding boxes (558) are for a single object and are reframed or normalized with respect to the trajectory of the object. The normalization of the bounding boxes (558) may set the zero point for the frame of reference as the average of the location information for the bounding boxes (558). For example, the zero point may be set to the average of central points of the bounding boxes of a trajectory. Similarly, the bounding boxes (560) include the bounding boxes for a trajectory of an object identified from the coarse initialization model (500).

The point cloud (565) may represent one or more of the point clouds (508) through (510) from the frames (502) through (505). The point clouds (562) and (565) may be filtered from the point clouds (508) through (510) to include portions from the point clouds that are near or within the area of the bounding boxes (558) and (560) for the objects (552) and (555). The portions of a point cloud may be near a bounding box by being within a threshold distance of the bounding box. As an example, the threshold of 10% may be used, which indicates that the length plus 10% and the width plus 10% of a bounding box is used to mask out portions of the point cloud that will be processed with the corresponding bounding box. The bounding boxes (558) and the point cloud (562) are input into the model (568) to generate the refined bounding boxes (570). Similarly, the bounding boxes (560) and the point cloud (565) are input into the model (568) to generate the refined bounding boxes (572).

The model (568) may be a machine learning model that generates the refined bounding boxes (570) through (572) from the bounding boxes (558) through (560) and the point clouds (562) through (565) for the objects (552) through (555). The trajectory (with the bounding boxes (558)) may be analogous to a sentence and the bounding boxes (558) analogous to words of the sentence. The model (568) operating on a trajectory may be analogous to a language model operating on a sentence. In an embodiment, the model (568) generates residuals that may be added to the bounding boxes (558) through (560) to form the refined bounding boxes (570) through (572).

The refined bounding boxes (570) are updated versions of the bounding boxes (558). As an example, the refined bounding boxes (570) include location information, size information, and direction information that has been updated and shows that the object may be substantially still. The refined bounding boxes (572) indicate that the object (555) has (based on the updated location information, size information, and direction information) moved and turned directions during the time from the first frame (502) to the last frame (505).

Figure 6:
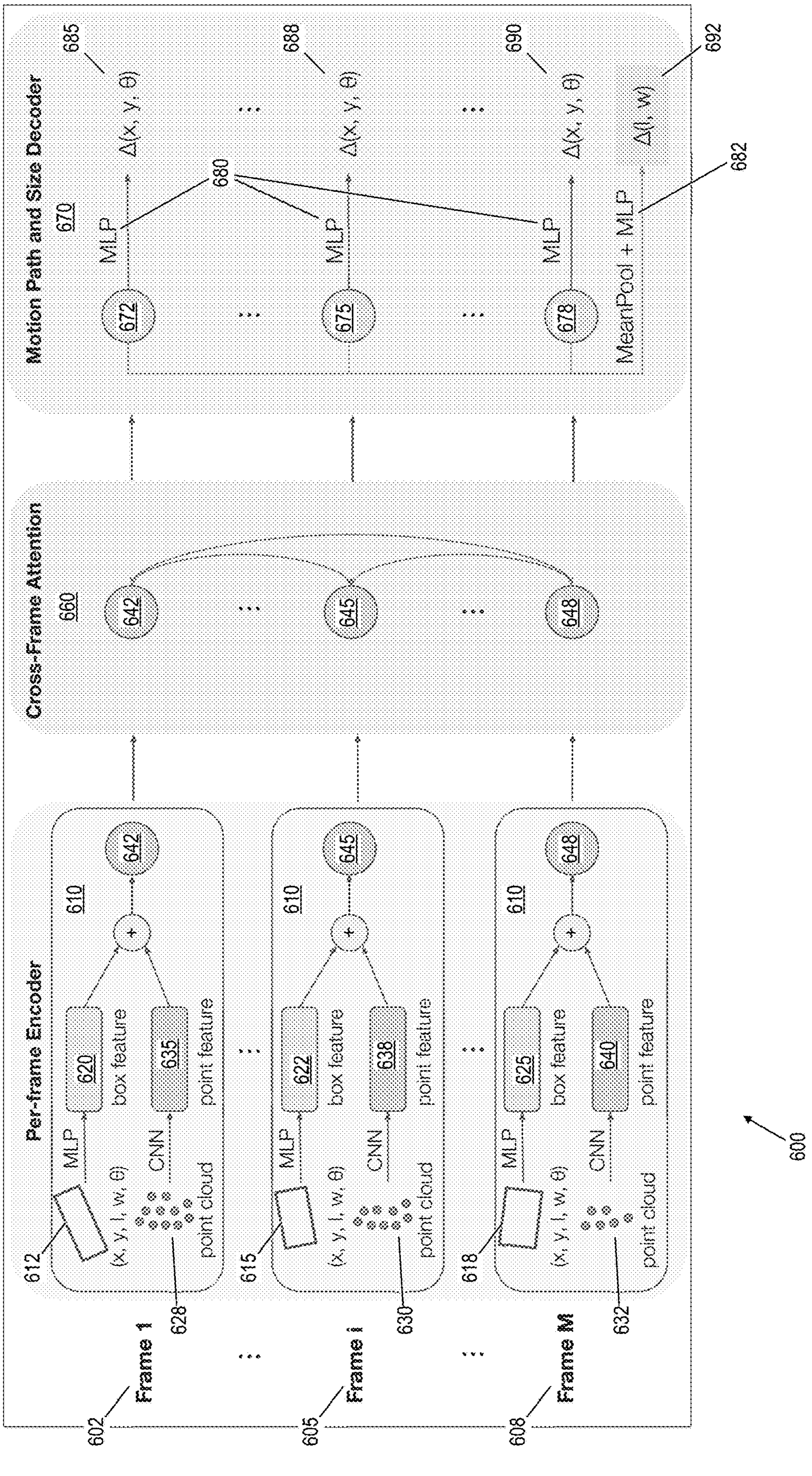

Turning to FIG. 6, the trajectory refinement model (600) processes the frames (602) through (608) to generate the pose residuals (685) through (690) and the size residual (692). The trajectory refinement model (600) includes the encoder model (610), the attention model (660), and the decoder model (670).

The encoder model (610) may process each of the frames (602) through (608) individually to generate the combined feature vectors (642) through (648). For the frame (602) the encoder model (610) processes the bounding box vector (612) and the point cloud (628) to generate the box feature vector (620) and the point cloud feature vector (635). The box feature vector (620) and the point cloud feature vector (635) are combined to form the combined feature vector (642). In an embodiment, the encoder model (610) includes a perceptron model (a multi-layer perceptron, for example) that processes the box vector (612) to generate the box feature vector (620). In an embodiment, the encoder model (610) includes a convolutional neural network to process the point cloud (628) to generate the point cloud feature vector (635). For the frame (605), the box vector (615) and the point cloud (630) are processed to generate the box feature vector (622) and the point cloud feature vector (638), which are combined to generate the box feature vector (645). Similarly, for the frame (608), the box vector (618) and the point cloud (632) are processed by the encoder model (610) to generate the box feature vector (625) and the point cloud feature vector (640), which are combined to form the combined feature vector (648). The combined feature vectors (642) through (648) as a set are input to the attention model (660).

In an embodiment, the encoder model (610) encodes the parameters of the bonding box vector (612) relative to the world frame and the points of the point cloud (628) are transformed to be in the object frame. The world frame may use the location of the autonomous system as the origin and the object frame may use the location of the object (e.g., the centroid of the object) as the origin.

The attention model (660) performs cross-frame attention by processing the combined feature vectors (642) through (648) using self-attention to generate the updated feature vectors (672) through (678). In an embodiment, the attention model (660) includes multiple attention layers that may each use multiple query, key, and value matrices (one set of query, key, and value matrices for one head of one layer) to process the combined feature vectors (642) through (648). The attention model (660) operates to process each of the combined feature vectors (642) through (648) with the set of the combined feature vectors (642) through (648) so that each of the updated feature vectors (672) through (678) are based upon each of the combined feature vectors (642) through (648) in conjunction with the weights of the query, key, and value matrices for the heads of the layers of the attention model (660). The output of the attention model (660) are the updated feature vectors (672) through (678), which include the updated feature vector (675) and are input to the decoder model (670).

The decoder model (670) processes the updated feature vectors (672) through (678) to generate the pose residuals (685) through (690) (including the pose residual (688)) and the size residual (692). The decoder model (670) includes the perceptron model (680) (which may include one or more layers), which may be applied to the updated feature vectors (672) through (678) individually to generate the pose residuals (685) through (690). For example, the perceptron model (680) may be applied to the updated feature vector (672) to generate the pose residual (685). As indicated, the pose residual (685) may include residuals for the x and y axis values for the bounding box vector (612) as well as a residual for the direction value for the bounding box vector (612).

For the size residual (962), a mean pooling layer may be applied to the updated feature vectors (672) through (678). The output of the mean pooling layer may be a single vector that is the average of the update feature vector (672) through (678). The average vector is then input to the perceptron model (682), which is a different perceptron model from the perceptron model (680). The perceptron model (682) processes the output from the mean pooling layer to generate the size residual (692). The size residual (692) includes values for the residual of the length and width of the mean of the lengths and widths of the box vectors (612) through (618).

Figure 7A:
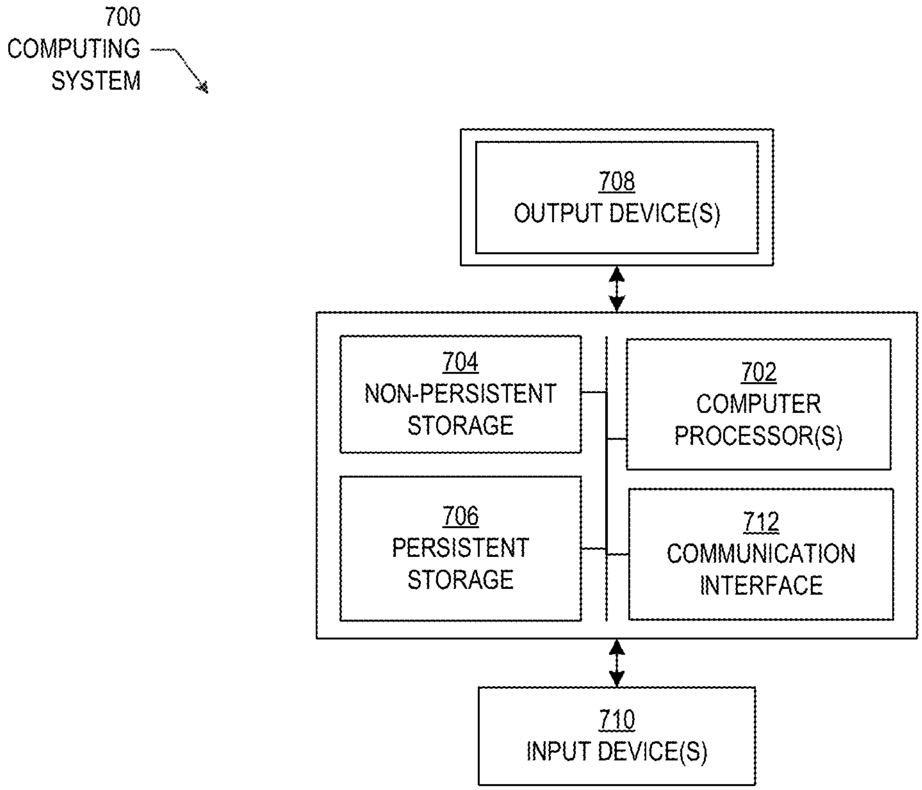
FIG. 7A and FIG. 7B show a computing system in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 7B:
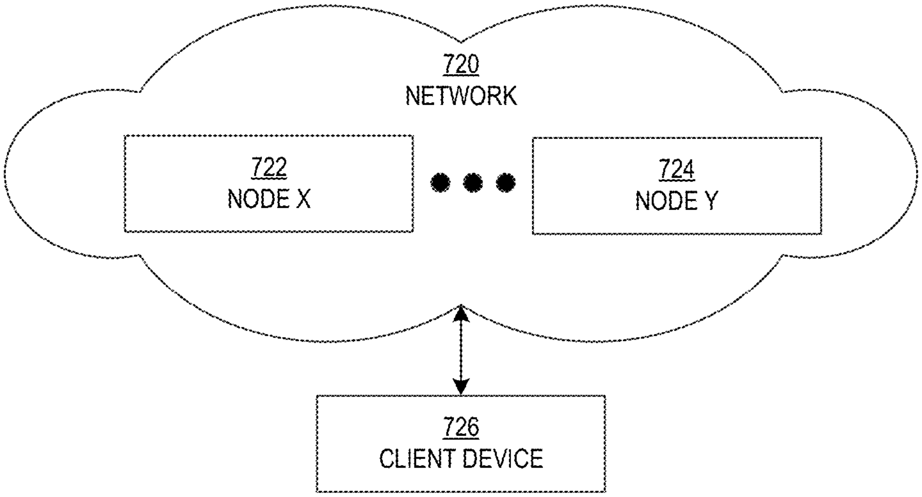

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "set of" may be used to denote one or more of the referenced elements. For example, referring to a "set of X" encompasses at least one instance of X and may include multiple instances of X.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

executing an encoder model with a set of bounding box vectors and a set of point clouds to generate a set of combined feature vectors from the set of bounding box vectors and the set of point clouds;

executing an attention model using the set of combined feature vectors to generate a set of updated feature vectors;

executing a decoder model using the set of updated feature vectors to generate a set of pose residuals and a size residual;

updating the set of bounding box vectors with the set of pose residuals and the size residual to generate a set of refined bounding box vectors; and executing an action responsive to the set of refined bounding box vectors.

2. The method of claim 1, wherein executing the encoder model further comprises:

executing a box encoder model of the encoder model using the bounding box vector to generate a box feature vector, wherein the box encoder model comprises a perceptron model.

3. The method of claim 1, wherein executing the encoder model further comprises:

executing a point cloud encoder model of the encoder model using the point cloud to generate a point cloud feature vector, wherein the point cloud encoder model comprises a convolutional neural network.

4. The method of claim 1, wherein executing the encoder model further comprises:

executing a combination model of the encoder model using a box feature vector and a cloud feature vector to generate a combined feature vector of the set of combined feature vectors.

5. The method of claim 1, wherein executing the attention model further comprises:

executing an attention layer of the attention model to perform one or more transformations to the set of combined feature vectors to generate an updated feature vector of the set of updated feature vectors; and executing a subsequent attention layer using an output from the attention layer to generate the set of updated feature vectors.

6. The method of claim 1, wherein executing the decoder model further comprises:

executing a pose residual model of the decoder model using an updated feature vector of the set of updated feature vectors to generate a pose residual corresponding to the bounding box vector, wherein the pose residual model comprises a perceptron model.

7. The method of claim 1, wherein executing the decoder model further comprises:

executing a size decoder model using the set of updated feature vectors to generate the size residual, wherein the size decoder model comprises a mean pooling layer and a perceptron model.

8. The method of claim 1, wherein updating the set of bounding box vectors comprises:

generating the refined bounding box vector by combining a pose residual of the set of pose residuals and the size residual with the bounding box vector.

9. The method of claim 1, further comprising:

training a trajectory refinement model, which is a machine learning model comprising the encoder model, the attention model, and the decoder model to generate the set of pose residuals and the size residual from the set of bounding box vectors and the set of point clouds using training data, wherein the training comprises:

executing the trajectory refinement model using the training data to create training output, executing a loss function using the training output to generate training updates, and combining the training updates with the trajectory refinement model to update the trajectory refinement model.

10. The method of claim 1, wherein executing the action further comprises:

presenting a refined bounding box vector of the set of refined bounding box vectors.

11. The method of claim 1, wherein executing the action further comprises:

updating a course of a vehicle using the set of refined bounding box vectors.

12. A system comprising:

at least one processor; and a non-transitory computer readable medium for causing the at least one processor to perform operations comprising:

executing an encoder model with a set of bounding box vectors and a set of point clouds to generate a set of combined feature vectors from the set of bounding box vectors and the set of point clouds, executing an attention model using the set of combined feature vectors to generate a set of updated feature vectors, executing a decoder model using the set of updated feature vectors to generate a set of pose residuals and a size residual, updating the set of bounding box vectors with the set of pose residuals and the size residual to generate a set of refined bounding box vectors, and executing an action responsive to the set of refined bounding box vectors.

13. The system of claim 12, wherein executing the encoder model further comprises:

executing a box encoder model of the encoder model using the bounding box vector to generate a box feature vector, wherein the box encoder model comprises a perceptron model.

14. The system of claim 12, wherein executing the encoder model further comprises:

executing a point cloud encoder model of the encoder model using the point cloud to generate a point cloud feature vector, wherein the point cloud encoder model comprises a convolutional neural network.

15. The system of claim 12, wherein executing the encoder model further comprises:

executing a combination model of the encoder model using a box feature vector and a cloud feature vector to generate a combined feature vector of the set of combined feature vectors.

16. The system of claim 12, wherein executing the attention model further comprises:

executing an attention layer of the attention model to perform one or more transformations to the set of combined feature vectors to generate an updated feature vector of the set of updated feature vectors; and executing a subsequent attention layer using an output from the attention layer to generate the set of updated feature vectors.

17. The system of claim 12, wherein executing the decoder model further comprises:

executing a pose residual model of the decoder model using an updated feature vector of the set of updated feature vectors to generate a pose residual corresponding to the bounding box vector, wherein the pose residual model comprises a perceptron model.

18. The system of claim 12, wherein executing the decoder model further comprises:

executing a size decoder model using the set of updated feature vectors to generate the size residual, wherein the size decoder model comprises a mean pooling layer and a perceptron model.

19. The system of claim 12, wherein updating the set of bounding box vectors comprises:

generating the refined bounding box vector by combining a pose residual of the set of pose residuals and the size residual with the bounding box vector.

20. A non-transitory computer readable medium comprising computer readable program code for causing a computing system to perform operations comprising:

executing an encoder model with a set of bounding box vectors and a set of point clouds to generate a set of combined feature vectors from the set of bounding box vectors and the set of point clouds;

executing an attention model using the set of combined feature vectors to generate a set of updated feature vectors;

executing a decoder model using the set of updated feature vectors to generate a set of pose residuals and a size residual;

updating the set of bounding box vectors with the set of pose residuals and the size residual to generate a set of refined bounding box vectors; and executing an action responsive to the set of refined bounding box vectors.

* * * * *